United States Patent [19]

Rüttiger

[11] Patent Number: 4,992,784

[45] Date of Patent: Feb. 12, 1991

[54] REMOTE CONTROL SET

[75] Inventor: Anton Rüttiger, Wildflecken, Fed. Rep. of Germany

[73] Assignee: Preh, Elektrofeinmechanische Werke, Bad Neustadt, Fed. Rep. of Germany

[21] Appl. No.: 268,700

[22] Filed: Nov. 8, 1988

[30] Foreign Application Priority Data

Nov. 13, 1987 [DE] Fed. Rep. of Germany ....... 3738532

[51] Int. Cl.[5] .............................................. H04Q 1/00

[52] U.S. Cl. ......................... 340/825.720; 340/825.69

[58] Field of Search ...................... 340/825.72, 825.73, 340/825.69, 825.52; 455/603; 358/194.1; 341/176

[56] References Cited

U.S. PATENT DOCUMENTS 3,835,454 9/1974 Palmieri et al. ................ 340/825.73
4,218,681 8/1980 Hormann ....................... 340/825.72
4,334,221 6/1982 Rosenhagen .................. 340/825.72
4,529,980 7/1985 Liotine et al. ........................ 341/176
4,623,887 11/1986 Wells, II ......................... 340/825.72
4,712,105 12/1987 Köhler .......................... 340/825.72

OTHER PUBLICATIONS

Elektronik Wirbauen die Elemente Valvo, Integrierte Digitalschaltungen für die Unterhaltungselektronik, 12/1982.

*Primary Examiner*—Donald J. Yusko
*Assistant Examiner*—Edwin C. Holloway, III

[57] ABSTRACT

A remote control set is provided for two like or similar devices, each of which is adjustable by remote control independently of the other, for example beds in a room. Normally, each operator controls the functions of his/her device by means of his/her remote control transmitter, and only if necessary will he/she control the functions of the device of the partner. Erroneous operation of the partner's device is thus prevented to the greatest possible extent. For this purpose, a pushbutton switch is provided in each of the two remote control transmitters. When and as long as the pushbutton switch of the one transmitter is actuated, it controls the functions of the receiver of the partner.

3 Claims, 3 Drawing Sheets

REMOTE CONTROL SET

BACKGROUND OF THE INVENTION

The invention relates to a remote control set for two similar or identical devices adjustable by remote control independently of each other, for example beds in a room, wherein the first device is provided with a first receiver and the second device is provided with a second receiver; wherein a first cableless remote control transmitter is allocated to the first receiver and a second cableless remote control transmitter ist allocated to the second receiver; wherein both remote control transmitters have keys which select and activate the receiving channels of the devices, controlling various functions; and wherein there is an alternative of switching each remote control transmitter to the receiving channels of the one or the other receiver by means of an additional switch, so that, depending on the position of the additional switch and the operation of one of the keys, a single remote control transmitter can be switched to control one device or the other.

Bedroom furnishings have been known which include beds having in each a power drive for the adjustment of their top surfaces. An infrared remote control may be provided for controlling, and each bed is assigned a remote control transmitter of its own, for each bed to be adjustable independently of each other.

In a remote control set in which separate transmitters have been allocated to each one of a plurality of receivers, it is known to construct the transmitters such that, by way of an additional switch, they can be switched to a different receiver. The additional switch is a slide switch or constituted by key contacts. In both cases, the transmitter is switched from one receiver to another in such a manner that a setting, once selected, is permanent and remains unchanged until renewed switching occurs. The operator must therefore first make sure to which receiver the transmitter concerned is set if he wants to avoid the erroneous actuation of a different receiver.

An apparatus of this type is unsuitable for remote control of the above-mentioned beds, since then there is the risk that, by mistake, the bed of the other person is adjusted instead of one's own bed. The same applies if other devices allocated to an operator, such as bedside lamps and/or alarm clocks, are also to be controlled by means of the remote control set.

An integrated component part, SAA 3004 (Valvo), is known on the market which is suitable for the construction of multichannel, addressable transmitters.

SUMMARY OF THE INVENTION

It is a feature of the present invention to provide a remote control set of the type described above with which each operator usually only controls the functions of his/her device by means of his/her remote control transmitter; the operator will control the functions of the device of the other operator only if necessary. Erroneous actuation of the other operator's device is excluded to the greatest possible extent.

According to the invention, this feature is achieved by providing each of the two remote control transmitters with a pushbutton switch as an additional switch, so that when and as long as the pushbutton switch of the first remote control transmitter is actuated, the functions of the second receiver are controllable by the keys of the first remote control transmitter; so that after actuation of this pushbutton switch is finished, the functions of the first receiver are controllable by the keys of the first remote control transmitter; so that as long as the pushbutton switch of the second remote control transmitter is actuated, the functions of the first receiver are controllable by means of the keys of the second remote control transmitter; and so that after actuation of this pushbutton switch, the functions of the second receiver are controllable by the keys of the second remote control transmitter.

If the operator of this set does not want to operate his/her own device but that of his/her partner, he/she has to actuate both the pushbutton switch of his/her transmitter and the key controlling the desirable function. As a result controlling a function of the device of the partner is only possible by an actuation of the transmitter with two fingers. Thus it is hardly possible to erroneously select a function of the partner'device. The operator need not make sure visually to which receiver his/her transmitter is set. Reliable operation is thus also possible in the dark.

Operation of the device of the partner is thus possible if, for example, a partner temporarily is not in a position to operate his/her transmitter, or has mislaid it.

Each time the pushbutton switch is released, the first remote control transmitter is automatically adjusted so that, when operated correspondingly, it selects the functions of the first receiver. Analogously, the same mode of operation applies to the second remote control transmitter.

In a preferred ambodiment of the invention, each remote control transmitter comprises an integrated circuit having an address gate terminal and address selection terminals, with the higher-order address selection terminal out of two address selection terminals selected having priority. Module SAA 3004 (Valvo), for example, is an integrated circuit of this type. The address gate terminal is connected to a lower-order address selection terminal and, via an emitter-to-collector path of a switching transistor, to a higher-order address selection terminal. Parallel to the emitter-to-collector path of the switching transistor, a voltage divider is arranged, which consists of a pushbutton switch and a resistor, the tap of which is connected to the base of the switching transistor. In the first remote control transmitter, the pushbutton switch is positioned between the base and the collector of the switching transistor, whereas in the second remote control transmitter, the pushbutton switch is positioned between the emitter and the base of the switching transistor. Thus, the functional principle described is realized with simple circuit technology.

In a further embodiment of the invention, the voltage divider comprises a terminal of reversible polarity. In manufacturing, it is therefore possible to produce the first and second transmitters of the same type and structure. By means of appropriately using the voltage divider, a transmitter will then be a first or a second transmitter.

Further advantageous embodiments of the invention are apparent from the following description of a non-limiting example.

DETAILED DESCRIPTION OF THE INVENTION

Figure 1:
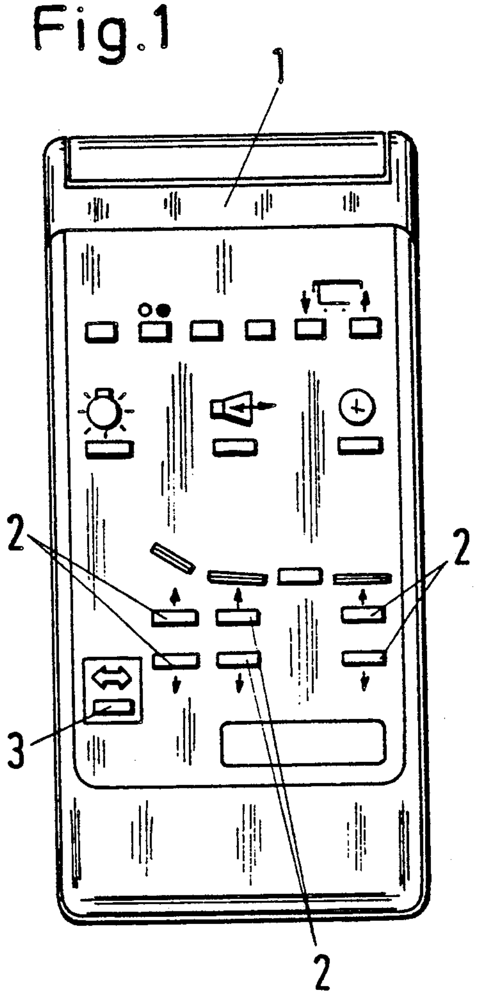
FIG. 1 shows a view of a remote control transmitter according to the invention.

An infrared remote control transmitter 1 has a plurality of keys 2. By actuation of the keys 2 it is possible to adjust a head part, an upper part and a foot part of a bed. For this purpose, the bed is equipped with a corresponding receiver.

The remote control transmitter 1 is provided with a pushbutton switch 3.

For two beds put up in a bedroom, two remote control transmitters 1 are provided; when the pushbutton switches 3 are not actuated, the one bed is adjustable by means of the keys 2 of the one remote control transmitter 1 and the other bed is adjustable by means of the keys 2 of the other remote control transmitter 1.

The two remote control transmitters 1 each comprise an integrated component part SAA 3004, for example. On its input side, it is connected to an oscillator 4 and to a matrix arrangement 5, on which the keys 2 act. An infrared transmitting module 6 is located on the output side of the integrated component part. The integrated component part is provided with an address gate terminal 7 and with address selection terminals 8, 9. If there is a signal at the address selection terminal 8, the transmitter—when the keys 2 are actuated—emits a sequence of pulses controlling the first receiver. However, if there is a signal at the address selection terminal 9, the transmitter emits a signal which, when a key 2 is actuated, controls the second receiver.

If there are signals at both address selection terminals 8, 9 simultaneously, the second receiver is selected because the address selection terminal 9 has priority.

The address gate terminal 7 is connected to the address selection terminal 8 via a line 10 in which a diode D1 is arranged. Moreover, the address gate terminal 7 is connected to the address selection terminal 9 via an emitter-to-collector Path E-K of a switching transistor T and via a further diode D2.

A voltage divider consisting of a resistor R and of the pushbutton switch 3 is connected parallel to the emitter-to-collector path E-K. The tap of the voltage divider is located at the base B of the transistor T.

Figure 2:
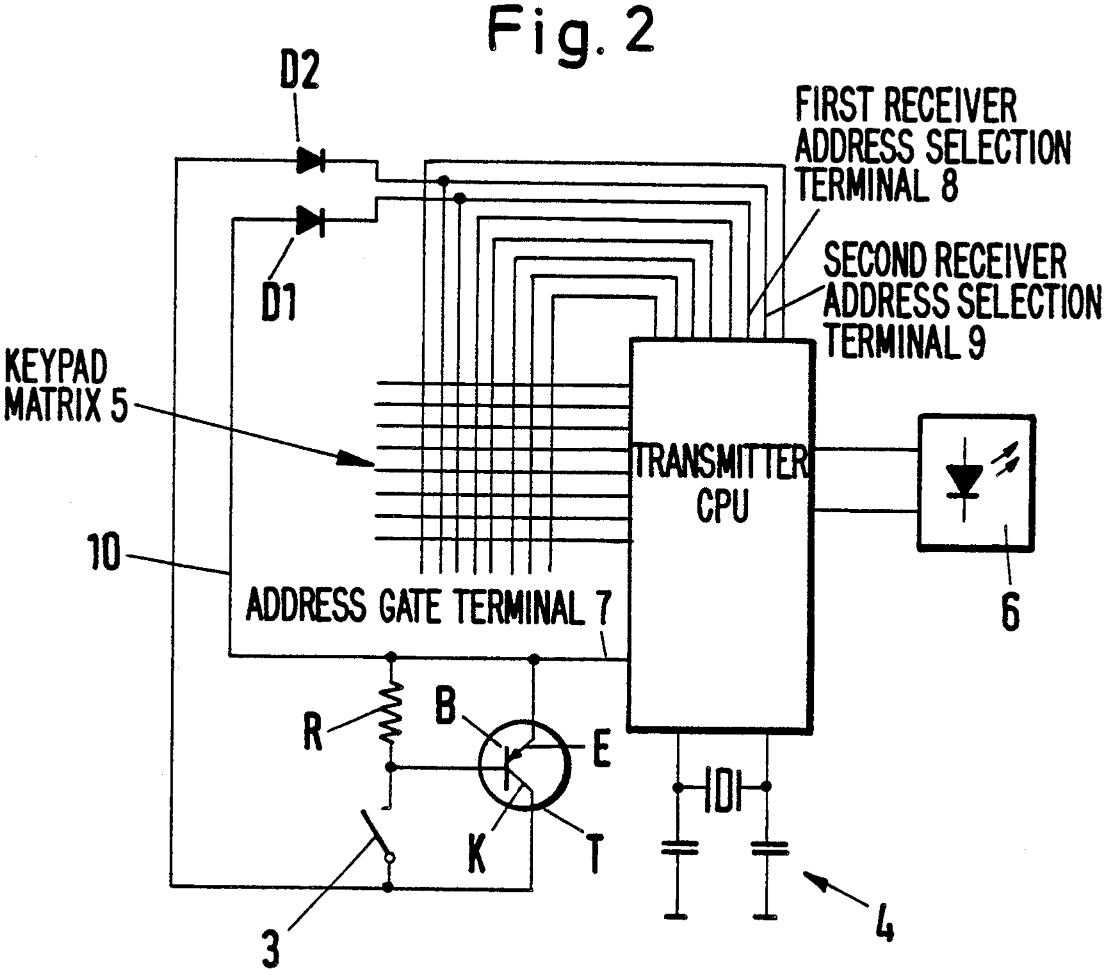
FIG. 2 shows a wiring diagram of a first remote control according to the invention.
Figure 3:
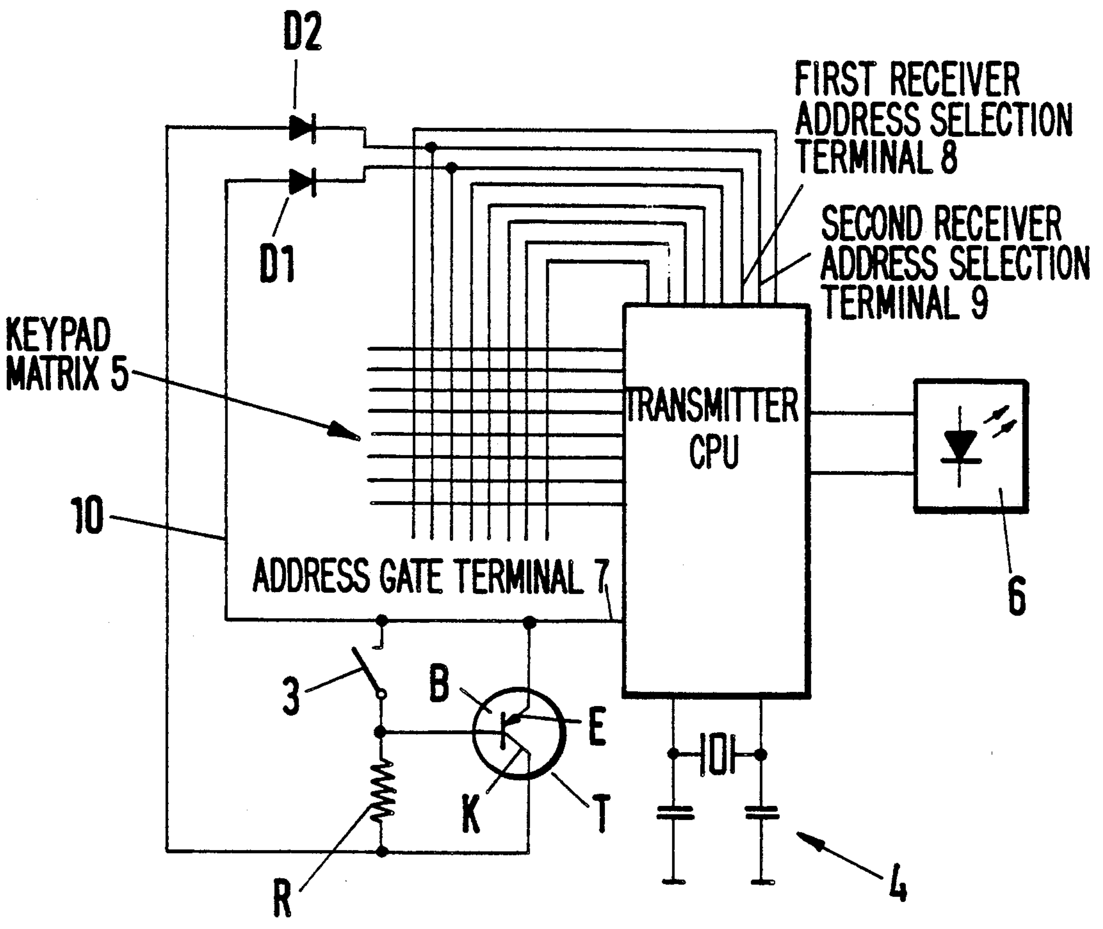
FIG. 3 shows a wiring diagram of a second remote control transmitter according to the invention.

The pushbutton switch 3 of the first transmitter 1, which is normally allocated to the first receiver, is positioned between the base B and the collector K of the switching transistor T (cf. FIG. 2).

The principle of operation is essentially as follows:

The pushbutton switches 3 of both transmitters 1 are normally open.

When the pushbutton switch 3 of the first transmitter 1 is open, the transistor T is in a reverse state, so that, via the line 10, there is a signal only at the address selection terminal 8. The first transmitter 1 is thus allocated to the first receiver. When the pushbutton switch 3 of the first transmitter I is closed, the transistor T will become conductive, so that now the signal of the address gate terminal 7 is at both address selection terminals 8, 9. Since the address selection terminal 9 takes precedence, the first transmitter 1 is now allocated to the second receiver, so that, as long as the pushbutton switch 3 is closed, the first transmitter 1 controls the functions of the second receiver when a key 2 is correspondingly actuated.

As soon as the pushbutton switch 3 is released and thus open, the first transmitter 1 is ready again to control the first receiver.

When the pushbutton switch 3 of the second transmitter 1 is open, the transistor T is in a conductive state, so that the signal of the address gate terminal 7 is at both address selection terminals 8, 9. With the address selection terminal 9 taking precedence, the second transmitter 1 controls the second receiver when there is a corresponding actuation of a key 2.

When the pushbutton switch 3 of the second transmitter 1 is closed, the transistor T is in a reverse state, so that now the signal of the address gate terminal 7 remains only at the address selection terminal 8. The second transmitter is thus ready to control the function of the first receiver. After the pushbutton switch 3 is released, the second transmitter 1 is ready again to control the functions of the second receiver.

Since the first transmitter 1 and the second transmitter 1 only differ in the arrangement of the voltage divider 3, R, the voltage divider 3, R is provided as a plug-in unit, which can be plugged into the transmitter either in the one or the other polarity.

What is claimed is:

1. A remote control set for controlling two devices by remote control independently, comprising:

first receiver for receiving signals directed to controlling a first device;

second receiver for receiving signals directed to controlling a second device;

a first remote control transmitter;

a second remote control transmitter;

said first remote control transmitter and said second remote control transmitter each comprising a device selector switch, wherein:

said first remote control transmitter communicates with said first receiver when the device selector switch of said first remote control transmitter is in a first position;

said second remote control transmitter communicates with said second receiver when the device selector switch of said second remote control transmitter is in said first position;

said first remote control transmitter communicates with said second device when said device selector switch of said first remote control transmitter is in a second position;

said second remote control transmitter communicates with said first device when said device selector switch of said second remote control transmitter is in said second position;

said device selector switches being in said second position only while being manually depressed, so that as long as said selector switch of said first remote control transmitter is manually depressed, operation of said second receiver is controlled by said first remote control transmitter, and so that as long as said device selector switch of said second remote control transmitter is manually depressed, operation of said first receiver is controlled by said second remote control transmitter.

2. A remote control set according to claim 1, wherein each remote control transmitter comprises an integrated circuit having an address gate terminal and address selection terminals of higher and lower order addresses, with the higher-order address selection terminal having priority when two address selection terminals are selected, wherein:

the address gate terminal is connected to the lower-order address selection terminal and, via an emitter-to-collector path of a switching transistor, to the higher-order address selection terminal; parallel to the emitter-to-collector path of the switching transistor, a voltage divider is arranged which consists of the device selector switch and a resistor and the tap of which is connected to the base the switching transistor; and in the first remote control transmitter, the device selector switch is positioned between the base and the collector of the switching transistor, and in the second remote control transmitter, the pushbutton switch is positioned between the emitter and the base of the switching transistor.

3. A remote control set according to claim 2, wherein the voltage divider comprises a terminal of reversible polarity.

* * * * *